(12) United States Patent
Helsloot et al.

(10) Patent No.: US 9,596,541 B2
(45) Date of Patent: Mar. 14, 2017

(54) POST-FILTER FOR HANDLING RESONANCE-INDUCED ECHO COMPONENTS

(71) Applicant: Dialog Semiconductor B.V., 's-Hertogenbosch (NL)

(72) Inventors: Michiel Helsloot, 's-Hertogenbosch (NL); Georgios Flamis, Patras (GR); Gavin Radolan, Satellite Beach, FL (US)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 9 days.

(21) Appl. No.: 14/479,762

(22) Filed: Sep. 8, 2014

(65) Prior Publication Data

US 2015/0195648 A1    Jul. 9, 2015

(30) Foreign Application Priority Data

Jan. 8, 2014    (EP) .................................... 14150487

(51) Int. Cl.
*H04B 3/20* (2006.01)
*H04R 3/02* (2006.01)
*H04M 9/08* (2006.01)
*H04B 15/00* (2006.01)
*H04M 1/60* (2006.01)

(52) U.S. Cl.
CPC .............. *H04R 3/02* (2013.01); *H04M 9/085* (2013.01); *H04M 1/6041* (2013.01)

(58) Field of Classification Search
CPC ........ H04R 3/02; H04M 9/085; H04M 1/6041
USPC .................................. 381/66, 93; 455/114.2
See application file for complete search history.

(56) References Cited

U.S. PATENT DOCUMENTS

2013/0217349 A1* 8/2013 Helsloot .............. H04M 1/035 455/114.2

FOREIGN PATENT DOCUMENTS

EP    2 632 141    8/2013

OTHER PUBLICATIONS

European Search Report 14150487.8-1854, Mailed: Jul. 1, 2014, Dialog Semiconductor B.V.

* cited by examiner

*Primary Examiner* — Vivian Chin
*Assistant Examiner* — Ammar Hamid
(74) *Attorney, Agent, or Firm* — Saile Ackerman LLC; Stephen B. Ackerman (57) ABSTRACT

A method and system for improving echo suppression and/or duplexity of handsfree telephone applications is presented. An echo suppression unit for an electronic device comprising a loudspeaker and a microphone is described. The microphone is configured to capture a transmit signal, wherein the transmit signal comprises an echo of a receive signal rendered by the loudspeaker. The echo suppression unit is configured to determine, based on the receive signal, whether the receive signal comprises a first frequency component causing the echo of the receive signal to comprise a distortion component. The distortion component comprises one or more frequencies which are not comprised within the first frequency component. Furthermore, the echo suppression unit is configured to apply a post-filter to the transmit signal, if it is determined that the receive signal comprises the first frequency component. The post-filter is configured to selectively attenuate the distortion component.

13 Claims, 4 Drawing Sheets

POST-FILTER FOR HANDLING RESONANCE-INDUCED ECHO COMPONENTS

TECHNICAL FIELD

The present document relates to echo cancellation and/or echo suppression. In particular, the present document relates to a method and system for improving echo suppression and/or duplexity of handsfree telephone applications.

BACKGROUND

Electronic devices such as cordless and/or wireless telephones are often used in a handsfree mode where an audio signal received from the far-end (referred to as the receive signal or the far-end signal) is rendered by a loudspeaker of the electronic device. An echo of the rendered far-end signal may be captured together with an audio signal from the near-end (referred to as the near-end signal) by a microphone of the electronic device, thereby yielding the transmit signal which is to be transmitted to the sender of the far-end signal. As such, the transmit signal may comprise an echo of the far-end signal which may lead to annoying artefacts for the sender of the far-end signal.

Typical electronic devices comprise echo cancellation units for removing the echo from the transmit signal. These echo cancellation units are typically configured to determine an estimate of the echo comprised within the transmit signal based on the receive signal. The performance of such echo cancellation units typically decreases in case of distortions within the acoustic echo path. Such distortions may be induced by resonances (e.g. cabinet resonances or mechanical resonances) of an electronic device.

SUMMARY

The present document addresses the above mentioned short-coming of echo cancellation units and describes a method and a system for increasing the performance of echo cancellers in the presence of distortions in the acoustic echo path. According to an aspect, an echo suppression unit for an electronic device comprising a loudspeaker and a microphone is described. The electronic device may comprise a telephone. The microphone is configured to capture a transmit signal, wherein the transmit signal may comprise an echo of a receive signal rendered by the loudspeaker. The echo of the receive signal may be dependent on characteristics of an echo path between the loudspeaker and the microphone. In particular, the echo may comprise a first frequency component, which is also comprised within the receive signal. This first frequency component may be removed from the transmit signal using e.g. an echo cancellation unit. Furthermore, the echo may comprise a distortion component, wherein the distortion component typically comprises one or more frequencies which are not comprised within the first frequency component. The distortion component may be due to distortions and/or resonances caused by the electronic device, when rendering the receive signal comprising the first frequency component.

The echo suppression unit may be configured to selectively remove the distortion component from the echo of the receive signal comprised within the transmit signal. For this purpose, the echo suppression unit may be configured to determine, based on the receive signal, whether the receive signal comprises a first frequency component causing the echo of the receive signal to comprise a distortion component. Typically, the electronic device exhibits one or more distorting frequencies, such that a receive signal comprising a frequency component at the one or more distorting frequencies triggers substantial resonances, i.e. causes the echo of the receive signal to comprise substantial distortion components. Typically each distorting frequency triggers a different distortion component. Each distortion component may have a particular power spectrum or a particular spectral shape with frequencies in the vicinity of the respective distorting frequency.

The echo suppression unit may be further configured to apply a post-filter to the transmit signal, if it is determined that the receive signal comprises the first frequency component. In other words, if it is determined that the receive signal comprises a frequency component at a distorting frequency, which is known to trigger distortions and which is therefore known to generate a distortion component within the echo of the receive signal, a post-filter may be applied to the transmit signal, in order to remove the "to-be-expected" distortion component from the echo of the receive signal comprised within the transmit signal. As a result of this, a transmit signal which is free of distortions that are caused by the rendering of the receive signal may be provided.

The post-filter may be configured to selectively attenuate the distortion component. In particular, the post-filter may be a band-stop filter which selectively removes the distortion component from the transmit signal, thereby leaving unaffected the desired components of the transmit signal, e.g. near-end speech. Hence the echo suppression unit emits a transmit signal free of echo induced distortion components, while at the same time enabling a high degree of duplexity.

As indicated above, the distortion component which is triggered by a first frequency component at a particular distorting frequency may have a pre-determined power spectrum, i.e. may have a pre-determined spectral shape. The spectral shape of the distortion component may be determined experimentally for a particular electronic device. The post-filter may be dependent on the spectral shape of the distortion component. In particular, the post-filter may exhibit a frequency response which is substantially inverse to the spectral shape of the distortion component. By doing this, the distortion component may be removed from the transmit signal in a highly selective manner, without impacting other signal components.

The echo suppression unit may be configured to apply the post-filter to the transmit signal in the time-domain. Alternatively a frequency-domain implementation of the post-filter may be used. The use of time-domain filters may be beneficial with respect to aliasing and other artifacts caused by the use of frequency-domain techniques. Furthermore, the use of time-domain filters may be beneficial with respect to resource efficiency.

As indicated above, the distortion component may be due to distortions incurred by the receive signal on an echo path between the loudspeaker to the microphone. The distortions may be dependent on characteristics of the electronic device. Such characteristics may be reflected e.g. by a total harmonic distortion (THD) curve of the electronic device. The post-filter may be dependent on such characteristics of the electronic device. In particular, the post-filter may be dependent on a THD of the electronic device. The THD may exhibit a plurality of peaks at a plurality of distorting frequencies. The echo suppression unit may comprise (e.g. may store) a different (e.g. pre-determined) post-filter for each of the plurality of different distorting frequencies.

The electronic device typically exhibits resonances which are triggered by the rendering of a receive signal comprising at least one of the distorting frequencies of the electronic device. The resonances which are triggered by a distorting frequency may yield a corresponding distortion component within the transmit signal. As such, each distorting frequency may be associated with a different distortion component. Identifying the one or more distorting frequencies comprised within the receive signal may provide an indication of the corresponding one or more distortion components comprised within the transmit signal. Each of the distortion components may be associated with a corresponding post-filter which is configured to remove the respective distortion component. Hence, by analyzing the receive signal, the "to-be-expected" distortion components can be removed from the transmit signal, even though the distortion components comprise frequencies components which are not comprised within the receive signal.

Hence, the echo suppression unit may comprise a plurality of post-filters for a plurality of distorting frequencies of the electronic device, respectively. Furthermore, the echo suppression unit may be configured to apply one or more of the plurality of post-filters to the transmit signal, in dependence on the one or more distorting frequencies from the plurality of distorting frequencies comprised within the receive signal. Consequently, by applying different selective post-filters for the different distorting frequencies, all the distortion components caused by the rendering of the receive signal may be removed in a computationally efficient manner.

The echo suppression unit may be configured to apply an analysis filter (referred to as a first analysis filter) to the receive signal to yield a first analysis filtered signal. The first analysis filter may be configured to emphasize a frequency component of the receive signal at a first distorting frequency. Alternatively or in addition, the first analysis filter may be configured to isolate or to identify a frequency component of the receive signal at a first distorting frequency.

The rendering of a receive signal comprising the first distorting frequency may trigger resonances of the electronic device. In particular, the rendering of a receive signal comprising the first distorting frequency may cause a first distortion component within the transmit signal. The use of an analysis filter (notably a time-domain filter) is beneficial, as it provides a flexible means to control the shape of a post-filter based on the influence of the frequencies adjacent to the distorting frequency. Furthermore, the use of an analysis filter allows generating an analysis filtered signal which also comprises components at frequencies directly adjacent to the first distorting frequency. It has been shown that such adjacent frequencies may also have an impact on the generation of a distortion component. Hence, the use of an analysis filter allows an improved identification of distortion components.

The first analysis filtered signal may be used to determine whether the receive signal comprises a first frequency component at the first distorting frequency. For this purpose, the echo suppression unit may be configured to determine a first power value based on the first analysis filtered signal, to compare the first power value to a pre-determined power threshold, and to determine that the receive signal comprises a first frequency component at the first distorting frequency, if the first power value exceeds the pre-determined power threshold. The first analysis filter may be configured to emphasize and/or isolate frequency components of the received signal, at frequencies which are comprised within the distortion component (i.e., frequencies may have an impact on the generation of the distortion component).

The echo suppression unit may be configured to apply a first post-filter to the transmit signal, if it is determined that the receive signal comprises a first frequency component at the first distorting frequency. As indicated above, the first post-filter may be dependent on the first distorting frequency. The first post-filter may be associated with the first analysis filter. In particular, the first post-filter may be configured to de-emphasize frequency components of the transmit signal, and the corresponding first analysis filter may be configured to emphasize and/or isolate corresponding frequency components of the receive signal, and vice versa. In other words, the first post-filter may be a band-stop filter configured to attenuate frequency components of the transmit signal, which lie at and/or in the vicinity of the first distorting frequency. The first analysis filter may be a band-pass filter configured to isolate frequency components of the receive signal, which lie at and/or in the vicinity of the first distorting frequency.

Even more particularly, the first analysis filter may have an inverse frequency response with respect to the frequency response of the first post-filter. This may be beneficial with respect to the identification and the suppression of distortion components within the transmit signal, based on the receive signal. As already outlined above, the first post-filter may be dependent on a first distortion component caused by the resonances triggered by the rendering of a receive signal comprising the first distorting frequency. In particular, the echo suppression unit may comprise a plurality of post-filters for a corresponding plurality of distortion frequencies. In a similar manner, the echo suppression unit may comprise a plurality of analysis filters for a corresponding plurality of distortion frequencies.

In particular, the echo suppression unit may comprise a plurality of analysis filters configured to selectively emphasize a frequency component of the receive signal at a plurality of different distorting frequencies, respectively. Furthermore, the echo suppression unit may comprise a plurality of post-filters for the plurality of distorting frequencies, respectively. The echo suppression unit may be configured to identify, based on the plurality of analysis filtered signals, the one or more distorting frequencies at which the receive signal comprises frequency components. Furthermore, the echo suppression unit may be configured to apply the one or more post-filters from the plurality of post-filters, which correspond to the one or more identified distorting frequencies, to the transmit signal. Hence, the echo suppression unit may be configured to identify and remove a plurality of distortion components in a resource efficient manner.

The echo suppression unit may be configured to determine a type or a characteristic of rendering environment of the electronic device. Furthermore, the echo suppression unit may be configured to determine the post-filter based on the type or characteristic of rendering environment. As such, additional factors of the distortions of the echo path may be taken into account in an efficient manner.

Alternatively or in addition, the echo suppression unit may be configured to determine a positive transient and/or pulse within the receive signal. For this purpose, the echo suppression unit may comprise a derivative detector configured to identify an edge of the receive signal having a gradient which exceeds a pre-determined threshold. Such an edge within the receive signal may trigger mechanical resonances of the electronic device. Hence, such an edge may cause the echo of the receive signal to comprise a distortion component. The echo suppression unit may be further configured to apply a post-filter to the transmit signal, if it is determined that the receive signal comprises an edge or a transient or a pulse. As outlined above, the post-filter may be configured to selectively attenuate the distortion component.

In other words, the echo suppression unit may be configured to determine, based on the receive signal, whether the receive signal comprises an acoustic pulse with a gradient that exceeds a pre-determined gradient threshold. Furthermore, the echo suppression unit may be configured to apply the post-filter to the transmit signal, if it is determined that the receive signal comprises an acoustic pulse with a gradient that exceeds the pre-determined gradient threshold. As a result of this, pulse-induced distortion components within the transmit signal may be removed, thereby improving the degree of duplexity of the electronic device.

According to a further aspect, an electronic device comprising a loudspeaker adapted to render a receive signal received at the electronic device and a microphone adapted to capture a transmit signal is described. The transmit signal may comprise an echo of the rendered receive signal. In addition, the electronic device comprises an echo suppression unit as described in the present document.

The electronic device may further comprise an echo cancellation unit adapted to determine an estimate of the echo of the rendered receive signal, based on the receive signal and configured to subtract the estimate of the echo of the rendered receive signal from the transmit signal. Hence, the electronic device may be configured to remove the frequency components at the distorting frequencies (using the echo cancellation unit) and the distortion components (using the echo suppression unit) from the transmit signal in a frequency selective manner, thereby enabling a high degree of duplexity. In particular, the degree of duplexity may be improved compared to non-linear processing (NLP)-enhanced or half-duplex-switch enhanced solutions.

According to a further aspect, a method for suppressing an echo of a receive signal rendered by a loudspeaker of an electronic device comprised within a transmit signal captured by a microphone of the electronic device is described. The method comprises determining, based on the receive signal, whether the receive signal comprises a first frequency component causing the echo of the receive signal to comprise a distortion component. The distortion component comprises one or more frequencies which are not necessarily comprised within the first frequency component. Furthermore, the method comprises selectively attenuating the distortion component by applying a post-filter to the transmit signal, if it is determined that the receive signal comprises the first frequency component.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DESCRIPTION

Figure 1:
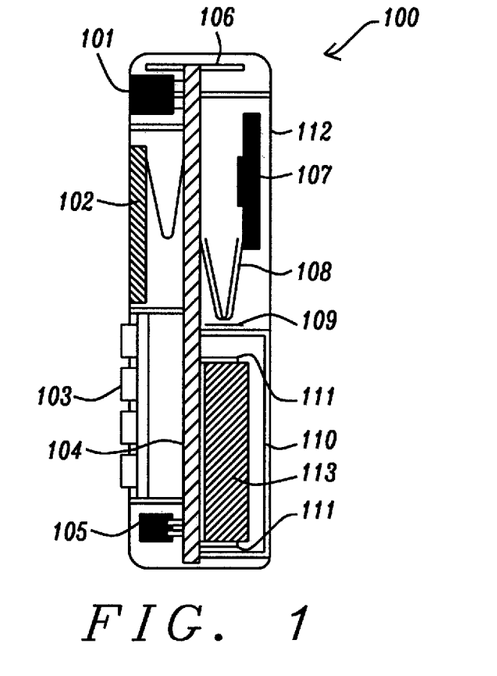
FIG. 1 illustrates an example electronic device.

FIG. 1 illustrates an example device 100 with which (and in particular within which) the systems and methods described in the present document may be used. The example device 100 comprises a transducer 107 (in the present example a loudspeaker) which is surrounded by a cabinet 112 (also referred to as an enclosure, casing or housing). The transducer 107 may be used to render a receive signal (e.g. a signal received from a remote calling party) when the device 100 is operated in a handsfree mode. The receive signal may also be referred to as the far-end signal. The example electronic device 100 may be a cordless handset or a wireless telephone. The device 100 may further comprise an earpiece 101 which may be the transducer for rendering the receive signal directly to the ear of a user of the device 100.

In addition, the device 100 typically comprises a microphone 105 for generating a transmit signal (e.g. to be transmitted from the device 100 to the remote calling party). When operated in the handsfree mode, the microphone 105 may not only capture an acoustic signal generated at the electronic device 100 (e.g. by the user), the microphone 105 may also capture an echo of the far-end signal rendered by the transducer 107. As such, the transmit signal may comprise a near-end signal which is generated at the electronic device 100 (e.g. by the user) and an echo of the far-end signal which is due to an echo path from the transducer 107 to the microphone 105 of the device 100.

Further components of the electronic device 100 may be a display 102, one or more keys of a keyboard 103, a PCB (Printed Circuit Board) 104, PCB retaining clips 109, Battery clips 111, a battery cover 110, a battery 113, leads and/or wires 108, and antennas 106. Overall, the electronic device 100 may be subject to various mechanical and acoustic resonances/distortions when rendering the receive signal. The resonances/distortions may be caused by the different components of the device 100, and/or by acoustic chambers formed by the different components.

Figure 2:
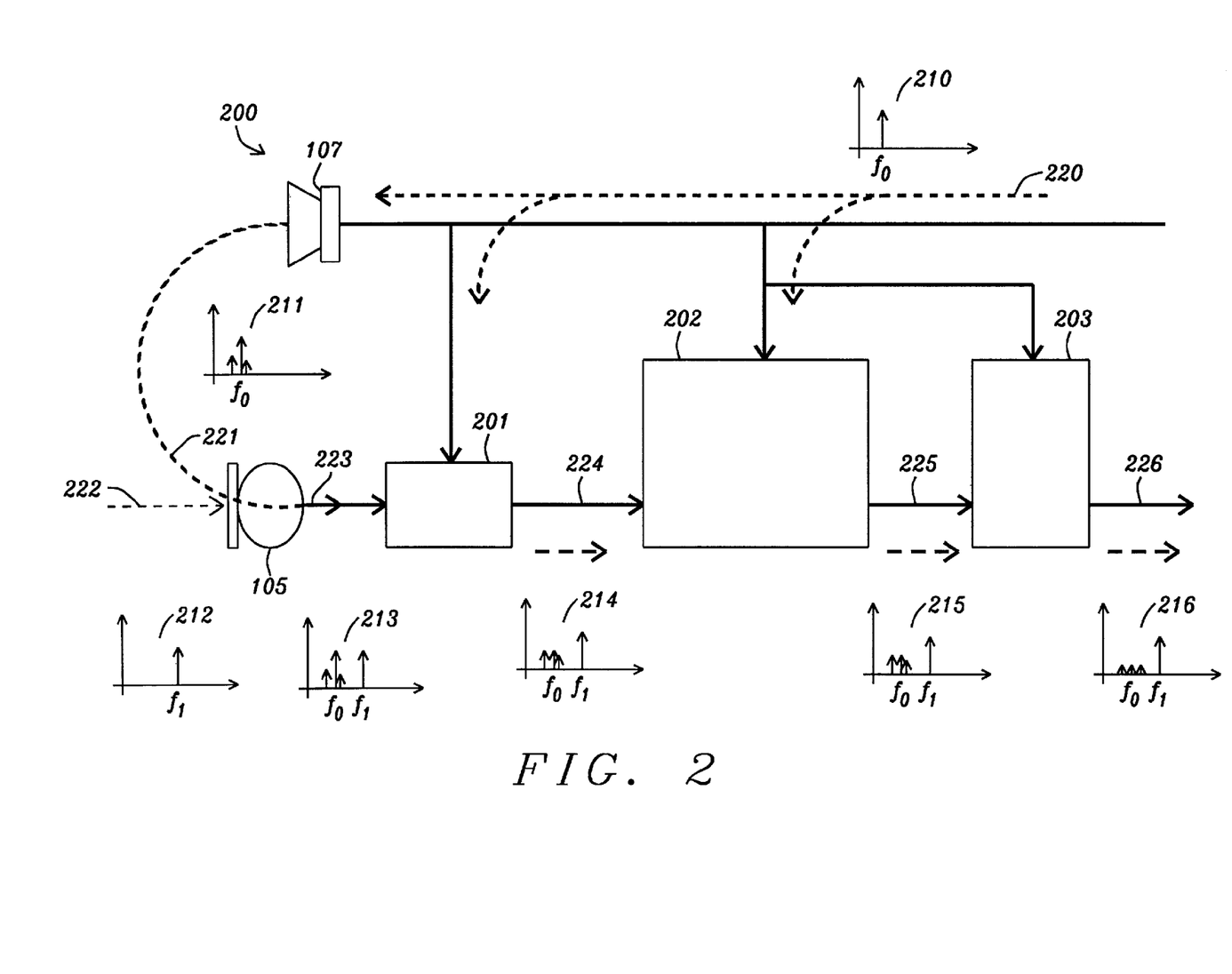
FIG. 2 shows example signal processing for reducing the echo on a transmit path of an electronic device in handsfree mode.

FIG. 2 illustrates example signal processor 200 which may be performed within the example device 100 of FIG. 1. Furthermore, an example spectrum 210 of a receive audio signal 220 comprising a single tone (or single sinusoid) at frequency $f_0$ is illustrated. The receive signal 220 (also referred to as the far-end signal 220) is received at the electronic device 100 (e.g. via the antenna 106 as in FIG. 1). The far-end signal 220 may be submitted to signal processing (not illustrated) on the receive path between the antenna 106 and the transducer 107, e.g. Automatic Gain Control (AGC) for limiting a level of the rendered far-end signal 220, volume control for adjusting a level of the rendered far-end signal 220 and/or equalization for modifying a spectral envelope of the rendered far-end signal 220.

Subsequent to the optional processing on the receive path, the far-end audio signal 220 is rendered by the transducer 107 of the electronic device 100 which results in a frequency spectrum 211 of the rendered far-end audio signal 221. The rendered far-end signal 221 may be distorted (due to resonances caused at the electronic device 100). This is illustrated by the additional frequencies in the vicinity of frequency $f_0$, comprised within the frequency spectrum 211.

The rendered far-end signal 221 may be captured by the internal microphone 105 of the electronic device 100 as an echo. Furthermore, the microphone 105 may capture a near-end signal 222. In the illustrated example, the spectrum 212 of the near-end signal 222 comprises a single tone (or single sinusoid) at frequency $f_1$. As such, the overall transmit signal 223 captured by the microphone 105 comprises a captured echo of the rendered far-end signal 221 and the captured version of the near-end signal 222. The spectrum 213 of the transmit signal 223 comprises frequency components of the near-end signal 222 (at frequency $f_1$), frequency components of the far-end signal 220 (at frequency $f_0$), and additional frequency components caused by distortions in the acoustic echo path.

The processor 200 may comprise an echo cancellation (e.g. within an echo cancellation unit 201) which is configured to estimate the echo of the far-end signal 210 comprised within the transmit signal 223. Example echo cancellation units 201 make use of one or more of the following estimation algorithms: LMS (Least Mean Square), nLMS (normalized LMS), IPnLMS (Improved Proportionate normalized Least-Mean-Square), APA (Affine Projection Algorithm), or RLS (Recursive Least Square). The estimation algorithm may be used to estimate the echo of the far-end signal 210 based on the far-end signal 210. The echo cancellation unit 201 is typically configured to (partly) cancel the frequency components of the far-end signal 220 (at frequency $f_0$) comprised within the transmit signal 223 by subtracting the echo estimate from the transmit signal 223, thereby yielding an echo compensated transmit signal 224. The spectrum 214 of the echo compensated transmit signal 224 is shown in FIG. 2. It can be seen that the energy of the frequency component at $f_0$ 214 is reduced as a result of the echo compensation performed in unit 201.

However, the echo cancellation unit 201 is typically only able to (partly) cancel the fundamental frequency $f_0$ of the distorted spectrum 211 of the rendered far-end signal 221, since the fundamental frequency $f_0$ is the only frequency present in the 'reference' input 220 (i.e. in the receive audio signal) of the echo cancellation unit 201. In other words, the echo cancellation unit 201 is typically only able to cancel the frequency components already comprised within the far-end signal 220. Hence, after cancelling the ground harmonic at frequency $f_0$ (i.e. after cancelling the frequency components comprised within the far-end signal 220), the output signal of the echo cancellation unit 201 typically comprises the distortion components of the echo signal (illustrated by the echo cancelled spectrum 214) as well as the frequency components of the near-end signal 222. Furthermore, the output signal of the echo cancellation unit 201 may still comprise a residual of the frequency components comprised within the far-end signal 220.

The signal processor may comprise a subband domain echo suppression unit 202. Typically, the subband domain echo suppression unit 202 considers the energy in the 'reference' signal 220 (i.e. in the far-end audio signal) after dividing the 'reference' signal 220 into L spectral subbands (L being an integer greater than one). For each subband the suppressor 202 estimates the echo energy and subtracts the estimated echo energy within the subband from the transmit signal 223 (e.g. from the transmit signal 223 subsequent to the echo cancellation unit 201). This is typically achieved by the application of an attenuation factor proportional to the amount of echo content in each subband. When a subband contains both echo and near-end speech, it is attenuated due to the echo, which leads to reduced duplexity.

In more detail, the subband domain echo suppression unit 202 (also referred to as the Spectral Subtraction Echo Suppressor 202) may make use of an algorithm which predicts the echo energy from the available spectral and temporal properties of the far-end signal 220. The prediction of the echo energy is typically based on an (adaptive) estimation of the coupling between the speaker 107 and the microphone 105. The subband domain echo suppression unit 202 subtracts the estimated echo energy from the transmit signal 223, thereby yielding an echo suppressed transmit signal 225.

The echo suppression applied within the subband domain echo suppression unit 202 is typically such that all frequency components of the transmit signal 223 (even the frequency components which are due to the near-end signal 222) are attenuated. This leads to a reduction of the duplexity of the electronic device 100, because the components of the near-end signal 222 within the transmit signal 223 may be attenuated such that the near-end signal 222 is not (or not sufficiently) audible by a user at the far-end. In view of the above, it is beneficial to modify the processing of the subband domain echo suppression unit 202 in order to improve the duplexity of the electronic device 100 (in particular, when operated in handsfree mode).

As outlined above, echo cancellers (time domain (e.g. LMS—based) and/or spectral domain echo cancellers) exhibit a reduced performance in case of distortions in the (acoustic) echo path. In typical handsfree applications, such distortions are present, wherein the speaker 107 is typically the dominant non-linear component in the acoustic path, and wherein the cabinet 112 as in FIG. 1, of the electronic device 100 usually contributes to non-linearities with various kinds of acoustic and mechanical resonances scattered across the audio spectrum 211.

To compensate for the loss of (full duplex) echo attenuation, a certain level of half duplex attenuation may be incorporated using an echo suppression unit 202. As outlined above, this attenuation comprises typically a single attenuation factor that attenuates the entire effective audio spectrum.

In the present document, the use of a post-filter 203 is proposed, which improves echo cancellation performance stability by increasing attenuation of critically affected frequencies within the transmit signal 223. The critically affected frequencies are typically the frequencies where the cabinet of the electronic device 100 exhibits substantial mechanical resonance and/or vibrations. At the same time the proposed post-filter 203 improves overall duplexity by focussing only on frequencies or subband which are affected by the mechanical resonances, while frequencies or subbands which are not affected by the resonances or distortions are not attenuated.

By doing so, the total application (comprising echo canceller and post-filter) demonstrates an improved echo removal stability and duplexity compared to a system which does not make use of the proposed post-filter and which makes use of a conventional half duplex switch.

As shown in FIG. 2, a receive signal 220 comprising a single tone at frequency $f_0$ may trigger mechanical resonances at frequencies near the tonal stimulus at frequency $f_0$. Echo suppression units 202 typically rely on a half duplex switch that attenuates the entire frequency band of a transmit signal 223 to reduce the resulting echo. The proposed post-filter 203 is configured to attenuate only frequencies which are affected by the mechanical resonances.

The echo of the distorted signal spectrum 211 is presented via the microphone 105 back to an LMS echo canceller 201, or to another type echo canceller 201. The echo canceller 201 is typically only able to cancel the original tonal or speech component (at frequency $f_0$) of the distorted echo spectrum 211, since this was the only frequency present in the 'reference' input 220 of the echo canceller 201. After cancelling the original tonal component, the output of the echo canceller 201 typically comprises only the mechanical resonance components (also referred to as the distortion components) of the echo signal. These distortion components may be spread across the full audio band of the transmit signal 223. Typically, the resonances increase if the stimulus (at frequency $f_0$) comprises harmonic content near the fundamental frequency of the mechanical resonances.

A subband domain echo suppressor 202 may be used to reduce the mechanical resonance components. As outlined above, such echo suppressors 202 are typically not able to handle these mechanical resonance components specifically. Furthermore, such echo suppressors 202 typically have a negative impact on full duplexity. FIG. 2 illustrates an example spectrum 215 of an echo suppressed transmit signal 225.

In the present document, the use of a mechanical resonance post-filter unit 203 is proposed. The post-filter unit 203 may be used in combination with or as an alternative to an echo suppressor 202. The post-filter unit 203 (also referred to as an echo suppression unit in the present document) may be configured to provide additional attenuation in the transmit path of a echo cancelling system (from the microphone 105 to the transmission network). The amount of attenuation which is applied by the post-filter unit 203 may be based on signal level and frequency characteristic estimations of the receive path of the same device 100 and may be based on knowledge regarding the electrical, mechanical and acoustical behaviour of the filters, amplifiers, transducers, acoustic cabinet and/or acoustic environment of the handsfree system. The post-filter unit 203 may be configured to predict the likelihood of mechanical resonances occurring in the echo path based on the characteristics of the receive signal 220 and based on the knowledge regarding the behaviour of the device 100 and/or the acoustic environment of the device 100. Furthermore, the post-filter unit 203 may be configured to determine an adaptive filter characteristic which attenuates the dominant artifacts resulting from mechanical resonances in the residual echo spectrum of the transmit signal 224 at the output of the echo canceller 201 and/or in the residual echo spectrum of the transmit signal 225 at the output of the echo suppressor 202. Hence, the post-filter unit 203 may be configured to apply a frequency-dependent attenuation to the transmit signal 225, wherein the frequency-dependent attenuation depends on the receive signal 220 and on pre-determined characteristics of distortions caused on the echo path between the loudspeaker 107 and the microphone 105 of the electronic device 100. FIG. 2 illustrates an example spectrum 216 of a transmit signal 226 which has been processed by the post-filter unit 203.

A mechanical resonance which is caused by a single frequency $f_0$ is typically pulsive in nature and therefore generates harmonics that may span a certain range of frequencies. The post-filter unit 203 may be configured to determine whether the receive signal 220 comprises one or more frequencies $f_0$ (referred to as distorting frequencies) which trigger substantial distortions. In particular, the post-filter unit 203 may be configured to compare one or more energy values derived from the receive signal 220 to a pre-determined threshold. When the one or more signal energy values are above the pre-determined threshold, this may be an indication for the fact that the rendering of the receive signal 220 triggers mechanical resonances or distortions in the echo path.

If it is determined that the receive signal 220 comprises one or more signal components which trigger distortions in the echo path, the post-filter unit 203 applies an attenuation to the frequency components of the transmit signal 223, which are affected by the resonances, in order to ensure suppression of the mechanical resonance component, thus providing a high degree of echo removal performance and minimal impact on duplexity. The attenuation makes the total application more robust against non-linear distortions in the acoustic echo path. Since the distortion components are typically captured by the post-filter in a frequency selective manner, the use of a half duplex switch echo suppressor 202 may not be needed.

Figure 3:
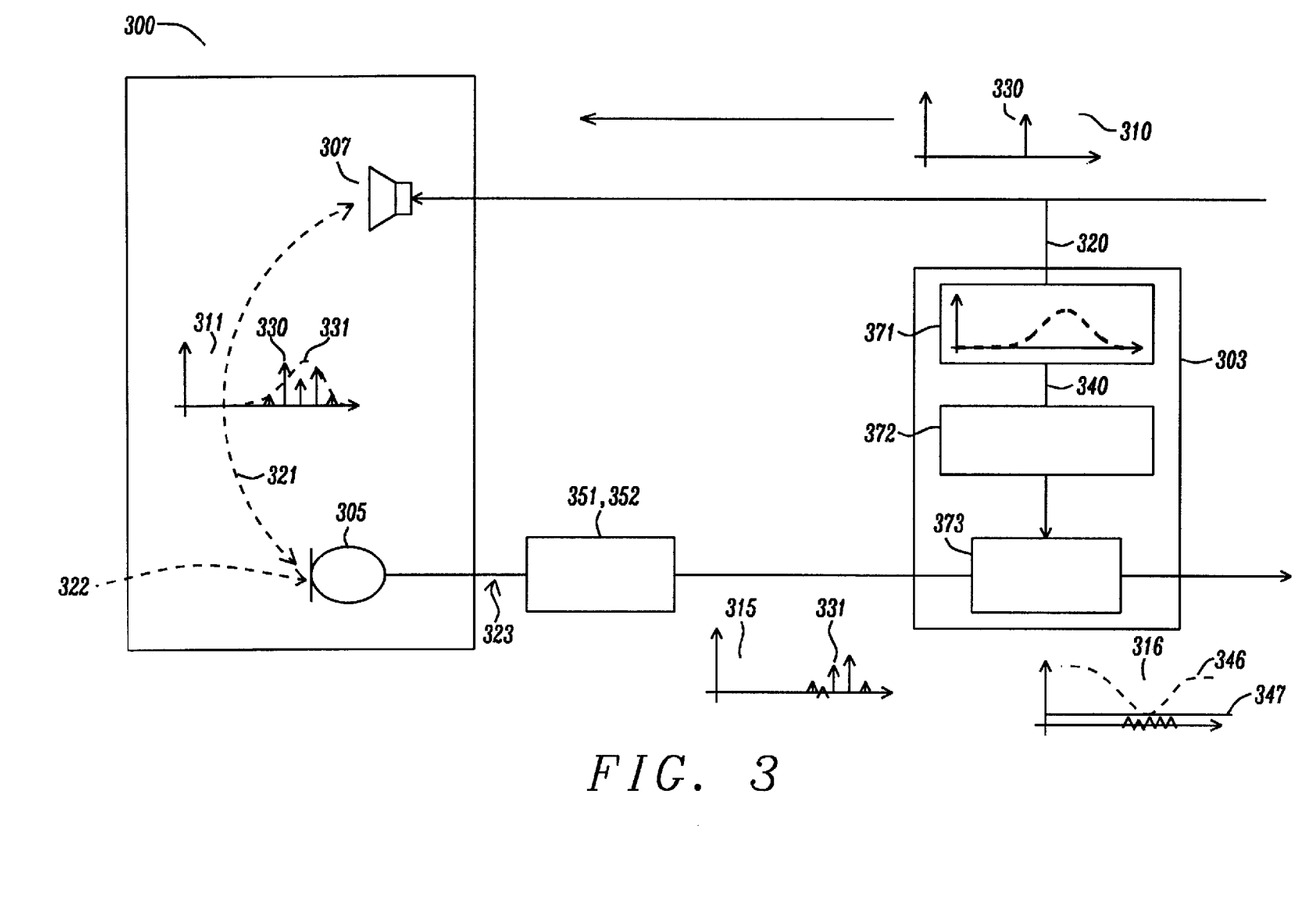
FIG. 3 shows further example signal processing for reducing the echo on a transmit path of an electronic device in handsfree mode.

FIG. 3 shows an example processor 300 comprising a post-filter unit 303. The receive signal 320 comprises a first frequency component 310 which generates distortions on the echo path between the loudspeaker 307 and the microphone 305. As a result of this, the rendered signal 321 comprises the first frequency component 310 as well as a distortion component 311. The distortion component 311 may be generated by the first frequency component 310 as a result of resonances of the electronic device 100 as shown in FIG. 1 and/or as a result of resonances within the acoustic environment of the electronic device 100 as shown in FIG. 1. The processor 300 further comprises an echo cancellation unit 371 and/or an echo suppression unit 372. These processing units 371 and 372 typically allow the first frequency component 330 to be removed from the transmit signal 323 in a reliable manner. On the other hand, the distortion component 331 may not be removed, thereby yielding a transmit signal 323 with the spectrum 315, which contains the spectrum of the distortion component 331.

The post-filter unit 373 may be configured to determine an estimate of the distortion component 331 within the transmit signal 323 based on the receive signal 320. For this purpose, the post-filter unit 373 may take into account pre-determined characteristics of the electronic device 100 as shown in FIG. 1 and/or pre-determined characteristics of the rendering environment of the electronic device 100 as shown in FIG. 1. By way of example, the post-filter unit 373 may take into account a pre-determined total harmonic distortion (THD) of the electronic device 100 as shown in FIG. 1.

Figure 4:
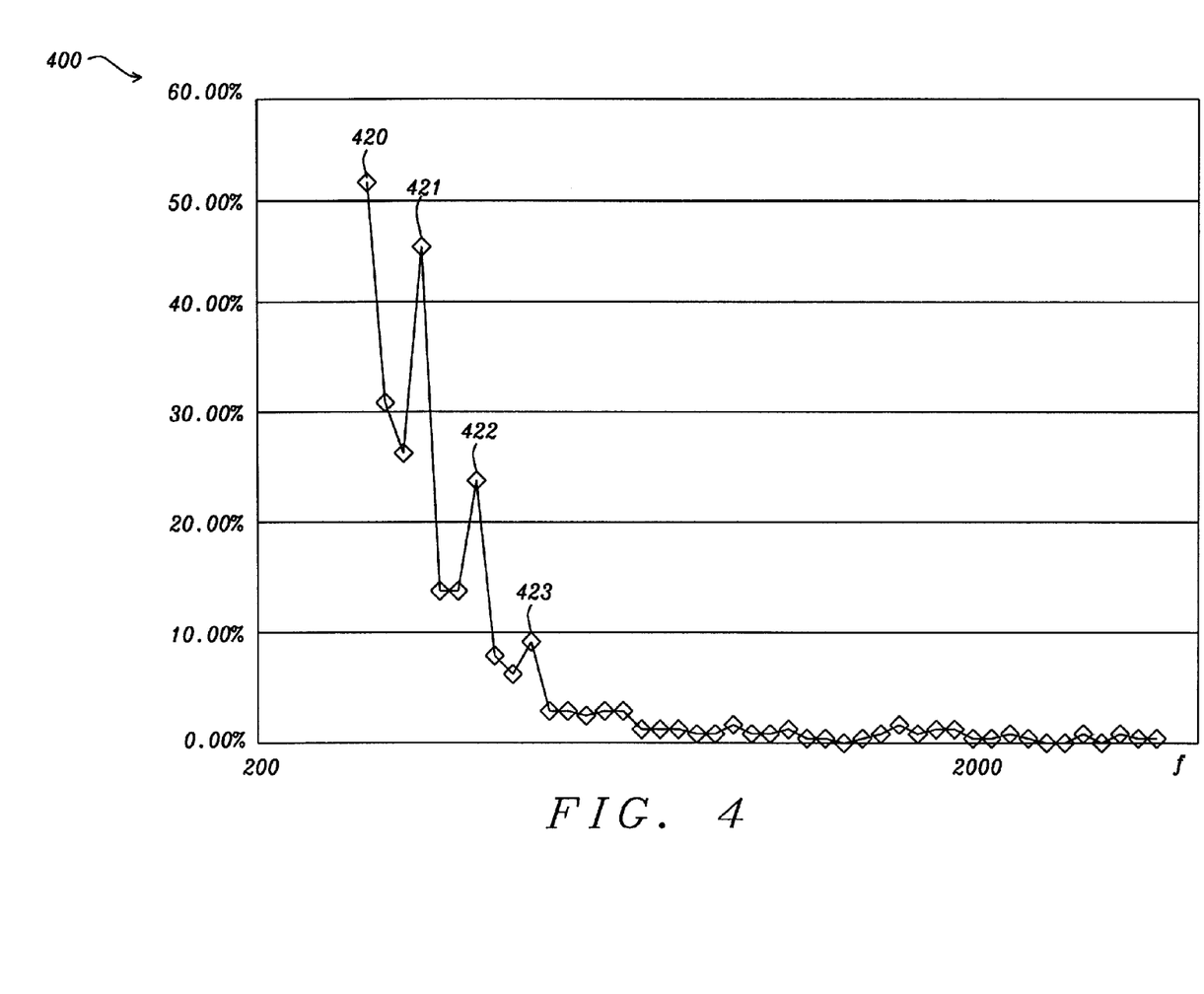
FIG. 4 shows an example total harmonic distortion curve of an electronic device.

An example THD 400 is illustrated in FIG. 4. It can be seen that the THD(f) curve 400 comprises a plurality of local maxima 420, 421, 422 and 423 for particular frequencies f for which a relatively high amount of distortion power at different frequencies is generated.

The total harmonic distortion (THD) characteristic of an electronic device 100 may be determined using a sweep of sinusoids at different frequencies (and/or possibly white noise) at the input to the receive signal path. The emitted sweep of sinusoids (or the white noise) may be recorded using the microphone 105 as shown in FIG. 1. The microphone 105 records the acoustic signal emitted by the speaker 107 as shown in FIG. 1 which is excited by a sinusoid at a particular first frequency f (or by the white noise). The emitted acoustic signal comprises signal power at the particular first frequency f. Furthermore, the emitted acoustic signal may comprise signal power at adjacent frequencies of the particular first frequency f. As already indicated above, such signal power at adjacent frequencies may be due to non-linear distortions (e.g. resulting from acoustic or mechanical resonances) of the signal at the first frequency f.

The THD for the particular first frequency f, i.e. THD(f), may be determined from the energy or power of the emitted audio signal at the particular first frequency f, and from the energy or power of the emitted audio signal at the adjacent frequencies. By way of example, the THD for the particular first frequency f may be determined as the ratio of the sum of all powers of the adjacent frequencies to the power of the particular first frequency f.

The post-filter unit 303 may be configured to determine whether a receive signal 320 comprises substantial frequency components 330 at the distorting frequencies 420, 421, 422 or 423 as shown in FIG. 4 of the electronic device 100 as shown in FIG. 1. The distorting frequencies 420, 421, 422 or 423 may be provided by the THD 400 of FIG. 4 of the electronic device 100. For this purpose, the post-filter unit 303 may make use of one or more analysis filters 371 which are configured to isolate and/or emphasis frequency components of the receive signal 323 at the distorting frequencies 420, 421, 422 or 423 and in the vicinity of the distorting frequencies 420, 421, 422 or 423 of the electronic device 100. By way of example, the post-filter unit 303 may make use of an analysis filter 371 for each of the distorting frequencies 420, 421, 422 or 423 of the electronic device 100. Hence, if the electronic device 100 exhibits N, N greater than zero or greater than one, distorting frequencies 420, 421, 422 or 423, the post-filter unit 303 may be configured to determine N analysis filtered signals 340 from the receive signal 323 using N analysis filters 311.

The post-filter unit 303 may be further configured to determine an energy or a power of an analysis filtered signal 340 (within unit 372). The energy or power of the analysis filtered signal 340 may be compared to a pre-determined threshold. If the energy or power of the analysis filtered signal 340 is greater than the pre-determined threshold, this may be indication for the fact that the receive signal 323 comprises a frequency component 330 which is likely to generate a corresponding distorting component 331, when being rendered by the electronic device. 100.

The post-filter unit 303 may be further configured to apply a post-filter (notably a band-attenuation filter) 373 to the transmit signal 323, if it has been determined that one or more of the analysis filtered signals 340 exceeds respective one or more pre-determined thresholds. In particular, the post-filter unit 303 may be configured to apply N different post-filters 373 for the N different distorting frequencies 420, 421, 422 or 423 of the electronic device 100, respectively. The post-filter 373 for a distorting frequency 420, 421, 422 or 423 typically depends on the spectrum 311 of the distortions which are caused by the corresponding distorting frequency 420, 421, 422 or 423. In particular, the N post-filters 373 for the N distorting frequencies 420, 421, 422 or 423 may be pre-determined by analysing the spectrum 311 of the rendered audio signal 321 for a receive signal 320 comprising (e.g. solely) one of the N distorting frequencies 420, 421, 422 or 423. The post-filter 373 for a first frequency component 330 comprising a first distorting frequency 420, 421, 422 or 423 may be designed such that it attenuates selectively the distortion component 331 of the rendered audio signal 321. Hence, the N post-filters 373 may be configured to selectively attenuate the distortions components 331 caused by the N different distorting frequencies 420, 421, 422 or 423, respectively.

FIG. 3 illustrates the spectrum 316 of a transmit signal 323 which has been processed by the post-filter unit 303, i.e. which has been filtered by a post-filter 373. It can be seen that the distortion component 331 has been removed from the transmit signal 323. This has been achieved by applying a post-filter having a frequency response 346 which substantially corresponds to the inverse of the power spectrum of the distortion component 331, thereby removing the distortion component 331. As a result of this, all echo components comprised within the transmit signal 323 lie below an overall attenuation target 347.

The post-filters 373 for the different distortion frequencies 420, 421, 422 or 423 may be dependent on the rendering environment of the electronic device 100. Typically, the distortion component 331 comprised within the spectrum 315 of the transmit signal 323 also depends on the type of environment within which the electronic device 100 is being used (e.g. a hall exhibiting a high degree of echo/reverberation, or a small room with almost no echo). Different post-filters 373 may be provided and may be applied for different types of rendering environments. The type of rendering environment may be determined (e.g. by measuring acoustic properties of the rendering environment upon activation of the handsfree mode, or based on user input). The post-filter unit 303 may then select an appropriate post-filter 373 based on the distorting frequency 420, 421, 422 or 423 and/or based on the type of rendering environment.

As outlined above, the use of band-stop post-filters 373 allows to selectively attenuate the distortion components 331 comprised within the transmit signal 323 with minimal effect upon the near-end signal 322 comprised within the transmit signal 323. As a result of this, duplexity can be improved and a high level of echo removal can be ensured.

Further duplexity improvements may be achieved by increasing the number N of distorting frequencies 420, 421, 422 or 423 which are considered and for which dedicated post-filters 373 are being used. By increasing the number N of separately analysed and filtered distorting frequencies 420, 421, 422 or 423, the attenuation which is applied to the transmit signal 323 can be applied in a more gradual manner.

Furthermore, the distortion detection efficiency may be improved by combining the threshold detection with positive signal derivative detection. The determination of a derivative of the time-domain receive signal and/or of the power of the receive signal may be used to identify a pulse or an edge within the receive signal. Such a pulse of an edge may be an indication of a possible onset of distortion. A pulse or edge may be determined if the derivative of the receive signal and/or of the power of the receive signal exceeds a pre-determined threshold. This may be an indication for the triggering of distortions in the echo path.

If an edge or pulse is detected, a post-filter may be applied to the transmit signal, in order to remove a distortion component comprised within the transmit signal. Alternatively or in addition, the application of the post-filter may be made dependent on the detection of an edge or pulse. By way of example, the post-filter may only be applied if the signal power of the receive signal (at a distorting frequency) exceeds a pre-determined power threshold and if the derivative of the receive signal or of the power of the receive signal is larger than a pre-determined gradient threshold. By doing this, the attenuation of the transmit signal may be made more selective, and the detection of distortions may be improved.

Further efficiency may be gained by adapting the pre-determined thresholds used within the comparison of the analysis filtered signals 340 to known battery levels in portable applications, where the speaker amplitude is related directly to the device's battery voltage level. In other words, the energy or power of the analysis filtered signals 340 may be compared to thresholds which are dependent on the level of a battery of the electronic device 100.

Further stability improvements may be obtained from an online parameter estimation and adaptation block that tracks changes in ageing and environmental parameters such as temperature and humidity. These inputs can be used to modify the mechanical resonance & distortion prediction. Inputs can come from additional (environmental) sensory inputs as well as from the actual echo canceller configuration and from the properties of the residual echo artifacts.

In other words, the distortion component 331 which is caused by the rendering of a first frequency component 330 may be dependent on the age of the electronic device 100 and/or on the environment conditions (such as temperature) of the electronic device 100. In order to address this, the post-filters 373 may be adapted to the age of the electronic device 100 and/or to the environmental conditions.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. An echo suppression unit for an electronic device comprising a loudspeaker and a microphone; wherein the microphone is configured to capture a transmit signal; wherein the transmit signal comprises an echo of a receive signal rendered by the loudspeaker; wherein the electronic device exhibits N different distorting frequencies, with N>1; wherein the rendering of a receive signal comprising at least one of the N distorting frequencies triggers resonances of the electronic device; wherein the echo suppression unit is configured to apply a first analysis filter of N pre-determined analysis filters to the receive signal to yield a first analysis filtered signal: wherein the N analysis filters are configured to isolate frequency components of the receive signal at the N distorting frequencies, respectively; wherein the first analysis filters are configured to isolate a first frequency component of the receive signal at a first distorting frequency of the N distorting frequencies; determine, based on the first analysis filtered signal, whether the receive signal comprises a first frequency component at the first distorting frequency causing the echo of the receive signal to comprise a distortion component; wherein the distortion component comprises one or more frequencies which are not comprised within the first frequency component; and apply a first post-filter of N pre-determined post-filters to the transmit signal, if it is determined that the receive signal comprises the first frequency component; wherein the first post-filter is configured to selectively attenuate the distortion component triggered by the first distorting frequency; wherein the N post-filters are dependent on the N distorting frequencies, respectively.

2. The echo suppression unit of claim 1, wherein the post-filter is dependent on a spectral shape of the distortion component.

3. The echo suppression unit of claim 1, wherein the distortion component is due to distortions incurred by the receive signal on an echo path between the loudspeaker to the microphone; the distortions are dependent on characteristics of the electronic device; and the first post-filter is dependent on the characteristics of the electronic device.

4. The echo suppression unit of claim 3, wherein the electronic device exhibits resonances triggered by the rendering of a receive signal comprising a distorting frequency; and the resonances triggered by the distorting frequency yield a distortion component within the transmit signal.

5. The echo suppression unit of claim 4, wherein the echo suppression unit is configured to apply one or more of the N pre-determined post-filters to the transmit signal, in dependence on the one or more distorting frequencies from the N pre-determining distorting frequencies, which are comprised within the receive signal.

6. The echo suppression unit of claim 1, wherein the echo suppression unit is configured to determine a first power value based on the first analysis filtered signal; compare the first power value to a pre-determined power threshold; and determine that the receive signal comprises a first frequency component at the first distorting frequency, if the first power value exceeds the pre-determined power threshold.

7. The echo suppression unit of claim 1, wherein the echo suppression unit is configured to identify, based on N analysis filtered signals obtained using the N analysis filters, the one or more distorting frequencies that the receive signal comprises frequency components at; and the echo suppression unit is configured to apply the one or more post-filters from N post filters, which correspond to the one or more identified distorting frequencies, to the transmit signal.

8. The echo suppression unit of claim 1, wherein the first analysis filter isolates frequency components which are attenuated by the first post-filter, and vice versa.

9. The echo suppression unit of claim 1, wherein the echo suppression unit is configured to determine a type of rendering environment of the electronic device; and determine the first post-filter based on the type of rendering environment.

10. The echo suppression unit of claim 1, wherein the echo suppression unit is configured to determine, based on the receive signal, whether the receive signal comprises an acoustic pulse with a gradient that exceeds a pre-determined gradient threshold; and apply the first post-filter to the transmit signal, if it is determined that the receive signal comprises an acoustic pulse with a gradient that exceeds the pre-determined gradient threshold.

11. An electronic device comprising a loudspeaker adapted to render a receive signal received at the electronic device; a microphone adapted to capture a transmit signal; wherein the transmit signal comprises an echo of the rendered receive signal; and an echo suppression unit of claim 1.

12. The electronic device of claim 11, further comprising an echo cancellation unit adapted to determine an estimate of the echo of the rendered receive signal, based on the receive signal; and subtract the estimate of the echo of the rendered receive signal from the transmit signal.

13. A method for suppressing an echo of a receive signal rendered by a loudspeaker of an electronic device comprised within a transmit signal captured by a microphone of the electronic device, wherein the electronic device exhibits N different distorting frequencies, with N>1; wherein the rendering of a receive signal comprising at least one of the N distorting frequencies triggers resonances of the electronic device: the method comprising the steps of: applying a first analysis filter of N pre-determined analysis filters to the receive signal to yield a first analysis filtered signal; wherein the N analysis filters are configured to isolate frequency components of the receive signal at the N distorting frequencies, respectively; wherein the first analysis filters are configured to isolate a first frequency component of the receive signal at a first distorting frequency of the N distorting frequencies; determining, based on the first analysis filtered signal, whether the receive signal comprises a first frequency component at the first distorting frequency causing the echo of the receive signal to comprise a distortion component; wherein the distortion component comprises one or more frequencies which are not comprised within the first frequency component; and applying a first post-filter of N pre-determined post-filters to the transmit signal, if it is determined that the receive signal comprises the first frequency component; wherein the first post-filter is configured to selectively attenuate the distortion component triggered by the first distorting frequency; wherein the N post-filters are dependent on the N distorting frequencies, respectively.

* * * * *